United States Patent [19]

Elias et al.

[11] 4,352,147
[45] Sep. 28, 1982

[54] CAPACITOR FOR HIGH VIBRATION ENVIRONMENTS HAVING A CONTROLLED GAS RESERVOIR

[75] Inventors: William H. Elias, Six Mile; Harold M. Granger, Greenville, both of S.C.

[73] Assignee: Sangamo Weston, Inc., Norcross, Ga.

[21] Appl. No.: 232,099

[22] Filed: Feb. 6, 1981

Related U.S. Application Data

[63] Continuation of Ser. No. 974,163, Dec. 28, 1978, abandoned.

[51] Int. Cl.$^3$ .......................... H01G 9/00; B01J 17/00
[52] U.S. Cl. ..................................... 361/433; 29/570
[58] Field of Search ........................... 29/570; 361/433

[56] References Cited

U.S. PATENT DOCUMENTS

| | | | |
|---|---|---|---|
| 3,346,781 | 10/1967 | Moresi et al. | 361/433 |
| 3,386,014 | 5/1968 | Burger et al. | 361/433 |
| 3,518,500 | 6/1970 | Jimerson | 361/433 |
| 3,681,666 | 8/1972 | Bowling | 361/433 |
| 3,789,502 | 2/1974 | Callins et al. | 29/570 |
| 3,793,569 | 2/1974 | Maijers | 361/433 |
| 3,806,769 | 4/1974 | Derrick et al. | 361/433 |
| 3,938,228 | 2/1976 | Kemkers et al. | 361/433 |
| 4,074,417 | 2/1978 | Pearce et al. | 361/433 |
| 4,117,579 | 10/1978 | Shaw et al. | 361/433 |
| 4,170,812 | 10/1979 | Bayno | 361/433 |

*Primary Examiner*—Andrew J. James
*Attorney, Agent, or Firm*—Dale V. Gaudier

[57] ABSTRACT

An electrolytic capacitor capable of withstanding high vibration environments includes a cylindrical capacitor case having an open end and a closed end, and cylindrically rolled alternate wraps of electrolyte impregnated paper and metal foil films with tabs abutting the foil films to electrically connect each of the foil films to a terminal. With the paper film on the outside of the cylindrical roll, the roll's outside diameter is tightly controlled to provide a snug fit when inserted in the case while the inside diameter of the roll is sized to provide a cylindrical volume in cubic inches equal to approximately 1.2 times the actual capacitance in farads times the desired rated voltage in volts so as to prevent a large pressure rise due to gas generation during capacitor operation. The paper films are axially longer than the other films towards the open end of the case while one of the foil films is axially longer towards the closed end of the case than the other films. When a cap and seal assembly is forced into the case to seal the open end, the terminals extend through the cap with one insulated and the other uninsulated from the cap. At the same time, the paper films are crushed against the cap to prevent flexing of the tabs between the foil films and the cap while the long foil film which is connected to the uninsulated terminal is crushed against the closed end of the capacitor case to allow heat transfer between the foil and the case.

19 Claims, 1 Drawing Figure

U.S. Patent  Sep. 28, 1982  4,352,147
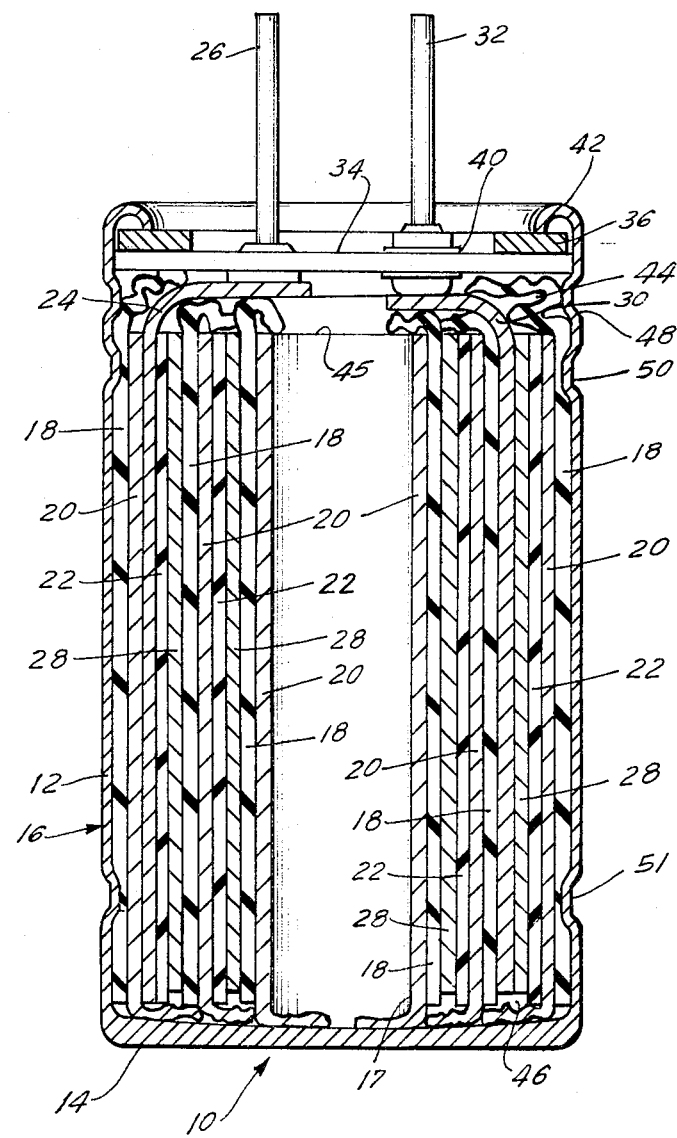

CAPACITOR FOR HIGH VIBRATION ENVIRONMENTS HAVING A CONTROLLED GAS RESERVOIR

This is a continuation of application Ser. No. 974,163 filed Dec. 28, 1978, and now abandoned.

BACKGROUND OF THE INVENTION

The present invention relates generally to electrolytic capacitors and moe particularly to electrolytic capacitors for high vibration environments.

In the past, electrolytic capacitors for high vibration environments have characteristically provided a series of annular body grooves on the side of the case that pressed radially inward to hold the capacitor element isolated from the sides of the capacitor case or extended the capacitor element towards the open and closed end of the case so the sealing would provide enough force to prevent radial movement while simultaneously limiting axial movement. These electrolytic capacitors have had the problem that there was no way of completely supporting the terminal tabs and thus the tabs flexed during vibration and eventually broke apart resulting in failure of the capacitor.

Also in the past, it was desired to have the smallest arbor hole possible so as to obtain the maximum amount of foil in capacitor with the smallest case possible.

Other electrolytic capacitor designs have included the use of a potting substance between the capacitor films and the capacitor case. While these designs hold the capacitor films, they were still subject to tab flexure failure and the potting substance was generally an insulator whih limited capacitor life due to internal heat build-up during operation.

SUMMARY OF THE INVENTION

The present invention provides an electrolytic capacitor in which the capacitor element is sized to fit with a predetermined fit into the case and contact the case throughout its entire surface area while simultaneously providing a controlled gas reservoir therein and also preventing any possible flexure of the terminal tabs. Other advantages will be apparent to those skilled in the art from a review of the following drawings and the detailed description of the preferred embodiment.

DESCRIPTION OF THE DRAWING

The drawing is a cross sectional view of a capacitor incorporating the present invention.

DESCRIPTION OF PREFERRED EMBODIMENT

Referring to the drawing, therein is shown an electrolytic capacitor 10 which includes a cylindrical case 12 closed at one end 14. The case 12 has disposed therein a capacitor element generally designated by the numeral 16.

The capacitor element 16 consists of alternating layers of paper spacer film and foil electrode film rolled on an arbor of a conventional capacitor element winding machine (not shown). The outside diameter of the capacitor element 16 is extremely tightly controlled s as to cause it to fit tightly into the case 12 after electrolyte impregnation. The fit which is termed a snug fit by those skilled in the art provides a minimum of clearance between the capacitor element 16 and the case 12. The capacitor element 16 has a first paper film 18 which is in contact with the cylindrical inner surface of the case 12.

The first paper film 18 is impregnated with a conventinal electrolyte and encircles a first foil film 20. The first foil film 20 is in electrical contact with a rectangular tab 24 to which a first terminal 26 is welded. The first foil film 20 encircles a second paper film 22 which is also impregnated with the electrolyte. The second paper film 22 further encircles a second foil film 28 which is electrically connected to a rectangular tab 30 to which is welded a second terminal 32.

The arboruponwhich the capacitor element 16 is wound provides an arbor hole generally designated by the numeral 17 in the center of the capacitor element. The arbor hole will be described in greater detail later.

The first and second terminals 26 and 32 extend through a seal and cpa assembly made up of a circular capacitor cap 34 and an annular seal 36. The second terminal 32 includes an annular sealing insulator 40 which isolates it from the capacitor cap 34. The first terminal 26 is electrically connected to the cap 34. The seal and cap assembly which seals the capacitor case 12 is held by a rolled over portion 42 of the capacitor case 12.

While either the first or second paper film 18 or 22 can be axially extended to the capacitor cap 34, in the preferred embodiment, both the paper films 18 and 22 are made substantially axially longer than the other films so as to be crushed and deformed by the insertion of the capacitor cap 34 to form a crushed portion, generally designated by the numeral 44, of the paper films. For comparison, the closed end 14 distal edges of the first and second foil films 20 and 28 are designated by the numeral 45.

While any one or combination of the films may be made longer in the axial direction towards the closed end 14, in the preferred embodiment, the first foil film 20 is made substantially axially longer than any of the other films so as to be crushed and deformed by the insertion of the capacitor cap 34 to form the crushed portion 46 of the first foil film 20.

Also, shown in the drawingnear the rolled over portion 42 of the capacitor case 12 are annular radial compression grooves 48, 50 and 51. The groove 48 prevents inward movement of the cap and seal assembly while the grooves 50 and 51 press the side of the capacitor case 12 into the capacitor element 16 to prevent relative motion therebetween.

In a high vibration environment, the snug fit between the capacitor element 16 and the capacitor case 12 aids the prevention of relative movement which could damage the capacitor element 16. Since this arrangement provides a minimal clearance space between the capacitor element 16 and the capacitor case 12, it has been found necessary to provide a sufficiently large arbor hole 17 to control the gas that is generated during aging and operation by allowing it to accumulate without causing a large pressure rise which would cause damage to the capacitor 10.

For a given capacitor, it has been empirically determined that the required volume in cubic inches of the arbor hole 17 must be a constant between 1 to 2 times the actual capacitance in farads times the rated voltage in volts. In the preferred embodiment, it has been further empirically determined that the actual capacitance in farads multiplied by the rated voltage in volts must be multiplied by a constant of approximately 1.2 to establish the minimum volume in cubic inches.

Since it has been determined that in many high vibration applications failure occurs due to flexure of the rectangular tabs 24 and 30, where they extend beyond the first and second foil films 20 and 28, by extending the axial length of the paper films it is possible to cause the crushed portion 44 to crush completely around the entire portion of the rectangular tabs 24 and 30 above the first and second foil films 2 and 28 so as to fully support the tabs against the capacitor cap 34 and prevent any flexure due to vibration. This crushed portion 44 also serves to prevent axial motion of the capacitor In a similar way, the crushed portion 46 of the first foil film 20 prevents movement of the capacitor element 16 towards the closed end 14 of the capacitor case 12. A further advantage of the crushed portion 46 is that the first foil film 20 is in direct contact with the capacitor case 12 allowing any heat built up in the capacitor element 16 to be more easily dissipated through the case 12 to the atmosphere.

As would be evident to those skilled in the art, if heat dissipation is not a problem, either or both of the paper films 18 or 22 could also be extended towards the closed end 14 instead.

With the present invention ithas been determined that an electrolytic capacitor capable of sustaining high frequency vibration of 10 hertz to 2,000 hertz at the 30 G level is possible while controlling internal pressure rise and allowing better heat transfer than conventional capacitors.

While the present invention has been described in conjunction with a specific embodiment, it will be apparent to those skilled in the art that many alternatives, modifications, and variations are possible. Accordingly, it is to be understood that the invention is not limited to the specific embodiment hereof but encompasses those alternatives, modifications, and variations which fall within the spirit and scope of the appended claims.

What is claimed is:

1. In a capacitor for providing a predetermined capacitance at a predetermined rated voltage, said capacitor including a case having disposed therein a first spacer film, a first electrode film abutting said first spacer film, a second spacer film containing a capacitor electrolyte and abutting said first electrode film, a second electrode film abutting said second spacer film, a first tab having a first terminal connected thereto abutting said first electrode film, and a second tab having a second terminal connected thereto abutting said second electrode film, the improvement comprising: said first spacer film disposed in said case with a predetermined fit leaving a minimum of clearance between said first spacer film and said case and said films having provided therein a predetermined gas volume in cubic inches less than a predetermined constant of two and greater than a predetermined constant of one times said predetermined capacitance in farads times said predetermined rated voltage in volts whereby relative motion between said films and said case is prevented while internal pressure rise of gas in said capacitor during operation is controlled.

2. The improvement as claimed in claim 1 wherein at least one of said spacer films is sized larger than said first and second electrode films proximate said sealing means than distal therefrom to be deformed against said case so as to urge said first and second tabs respectively toward said first and second terminals and to prevent relative motion between said tabs and said case.

3. The improvement as claimed in claim 2 wherein said case has an end distal from said first and second terminals and at least one of said spacer films is further sized larger than said first and second electrode films and the other spacer film proximate said end of said case to be deformed against said case when said larger size spacer film is deformed against said case.

4. The improvement as claimed in claim 3 wherein said case includes at least one indentation provided therein deforming said films to additionally prevent relative motion between said films and said case.

5. The improvement as claimed in claim 1 wherein one of said terminals is conductively connected to said case and the other said terminals extends through and is non-conductively connected to said case, and one of said electrode films conductively connected to said one of said terminals is sized larger than the other of said electrode films conductively connected to said other of said terminals and said second spacer film to be deformed against said case so as to engage said case and allow heat transfer thereto from said one of said electrode films.

6. In an electrolytic capacitor providing a predetermined capacitance at a predetermined rated voltage, said capacitor including a cylindrical case having disposed therein a first cylindrically rolled spacer film, a first cylindrically rolled electrode film abutting and encircled by said first cylindrically rolled spacer film, a second cylindrically rolled spacer film containing a capacitor electrolyte and abutting and encircled by said first cylindrically rolled electrode film, a second cylindrically rolled electrode film abutting and encircled by said second cylindrically rolled spacer film, a first tab having a first terminal connected thereto conductively abutting said first cylindrically rolled electrode film, a second tab having a second terminal connected thereto conductively abutting said second cylindrically rolled electrode film, and sealing means for sealing said films in said case, the improvement comprising: said first cylindrically rolled spacer film abutting, across its cylindrical outer surface, the cylindrical inner surface of said case with a snug fit leaving a minimum of clearance between said cylindrical outer surface of said first cylindrically rolled spacer film and said cylindrical inner surface of said case and said films filling said case to encircle and provide therein a predetermined cylindrical gas volume in cubic inches equal to a predetermined constant, between one and two, times said predetermined capacitance in farads times said predetermined rated voltage in volts whereby relative motion between said films and said case is prevented while internal pressure rise of gas in said capacitor during operation is controlled.

7. The improvement as claimed in claim 6 wherein said cylindrical case is open at one end and closed at the other end, said cylindrically rolled films have a center axis, and at least one of said cylindrically rolled spacer film is sized axially longer than said first and second cylindrically rolled electrode films toward said open end of said cylindrical case than toward said closed end to be deformed by said sealing means when said open end of said capacitor is sealed thereby so as to hold said first and second tabs against said sealing means and to prevent relative motion between said cylindrically rolled films and said sealing means whereby movement of said first and second tabs is prevented.

8. The improvement as claimed in claim 7 wherein at least one of said cylindrically rolled spacer films is further sized axially longer than said first and second cylindrically rolled electrode films and the other cylindrically rolled spacer film toward said closed end to be deformed by said sealing means sealing said open end of said cylindrical case so as to engage the closed end thereof to prevent relative motion between said films and said cylindrical case.

9. The improvement as claimed in claim 8 wherein said cylindrical case includes axially spaced annular indentations providedtherein to prevent relative motion between said cylindrically rolled films and said sealing means.

10. The improvement as claimed in claim 6 wherein said cylindrically rolled films have a central axis and one of said terminals is conductively connected to said sealing means and the other of said terminals extends through and is non-conductivelyconnected to said sealing means, and one of said terminals is axially longer than the other of said cylindrically rolled electrode films connected to said other of said terminals and said first and second cylindrically rolled spacer films to be deformed by said sealing means when said capacitor is sealed so as to engage the closed end of said case to allow heat transfer thereto from said one of said cylindrically rolled electrode films.

11. In an electrolytic capacitor providing a predetermined capacitance at a predetermined rated voltage, said capacitor including a cylindrical case having disposed therein a first cylindrically rolled spacer film, a first cylindrically rolled electrode film abutting and encircled by said first cylindrically rolled spacer film, a second cylindrically rolled spacer film containing a capacitor electrolyte and abutting and encircled by said first cylindrically rolled electrode film, a second cylindrically rolled electrode film abutting and encircled by said second cylindrically rolled spacer film, a first tab having a first terminal connected thereto conductively abutting said first cylindrically rolled electrode film, a second tab having a second terminal connected thereto conductively abutting said second cylindrically rolled electrode film, and sealing means for sealing said films in said case, the improvement comprising: said first cylindrically rolled spacer films abutting, across its cylindrical outer surface, the cylindrical inner surface of said case with snug fit leaving a minimum of clearance between said cylindrical outer surface of said first cylindrically rolled spacer film and said cylindrical inner surface of said case and said films filling said case to encircle and provide therein a cylindrical gas volume in cubic inches therein substantially equal to 1.2 times said predetermined capacitance in farads times said predetermined rated voltage in volts whereby relative motion between said films and said case is prevented while internal pressure rise of gasin said capacitor during operation is controlled.

12. The improvement as claimed in claim 11 wherein said cylindrical case is open at one end and closed at the other end, said cylindrically rolled films have a center axis, and said first cylindrically rolled spacer film is sized axially longer than said second cylindrically rolled spacer films and said first and second cylindrically rolled conductive films toward said open end than toward said closed end to be deformed by said sealing means when said open end of said capacitor is sealed thereby so as to support and urge said first and second tabs toward said sealing means and to prevent relative motion between cylindrically rolled films and said sealing means whereby movement of said first and second tabs is prevented.

13. The improvement as claimed in claim 12 wherein at least one of said cylindrically rolled spacer film is further sized axially longer than said first and second cylindrically rolled electrode films and the other cylindrically rolled spacer film toward said closed end than toward said open end to be deformed by said sealing means sealing said open end of said cylindrical case so as to engage the close end thereof to prevent relative motion between said seal means and said closed other end of said cylindrical case.

14. The improvement as claimed in claim 13 wherein said cylindrical case includes at least two annular indentations provided therein, one proximate said sealing means to prevent relative motion between said sealing means and said cylindrical case and one distal from said sealing means to prevent relative motion between said cylindrically rolled films and said sealing means.

15. The improvement as claimed in claim 11 wherein said cylindrically rolled films have a center axis substantially coincident with an axis of said cylindrical case passing through said sealing means and a sealing means distal portion of said cylindrical case and said first terminal is conductively connected to said sealing means and said second terminal extends through and is non-conductively connected to said sealing means, and said first cylindrically rolled electrode film connected to said first terminal is axially longer towards said sealing means distal portion of said cylindrical case than said second cylindrically rolled electrode film connected to said second terminal and said first and second cylindrically rolled spacer films to be deformed by said sealing means when said capacitor is sealed so as to engage the closed end of said case to allow heat transfer thereto from said first cylindrically rolled electrode film.

16. A capacitor for providing a predetermined capacitance at a predetermined rated voltage comprising; a case having disposed therein a first spacer film; a first electrode film abutting said first spacer film; a second spacer film containing a capacitor electrolyte and abutting said first electrode film; a second electrode film abutting said second spacer film; a first tab having a first terminal connected thereto abutting said first electrode film, a second tab having a second terminal connected thereto abutting said second electrode film; said films disposed in said case with a predetermined fit leaving a minimum of clearance between said films and said case; said films having provided therein a predetermined gas volume in cubic inches less than a predetermined constant of two and greater than a predetermined constant of one times said predetermined capacitance in farads times said predetermined rated voltage in volts whereby relative motion between said films and said case is prevented while internal pressure rise of gas in said capacitor during operation is controlled.

17. The capacitor as claimed in claim 16 wherein said predetermined gas volume provided in said films is substantially equal to a predetermined instant of 1.2 times said predetermined capacitance in farads times said predetermined rated voltage in volts.

18. A capacitor for providing a predetermined capacitance at a predetermined rated voltage, comprising: a case; extending in an axial direction and terminating in first and second ends oppositely disposed in the axial direction a first spacer film, disposed within said case in deformed abutment with said first end of said case with no clearance therebetween a first electrode film abutting said first spacer film in deformed abutment with said second end of said case with no clearance therebetween; a second spacer film containing a capacitor electrolyte and abutting said first electrode film; a second electrode film abutting said second spacer film; a first tab having a first terminal connected thereto abutting said first electrode film and held against said first end of said case by said first spacer film; a second tab having a second terminal connected thereto abutting said second electrode film and held against said first end of said case by said first spacer film; and said films disposed in said case with a predetermined fit leaving a minimum of clearance between said films and said case; said films having provided therein a predetermined gas volume in cubic inches less than a predetermined constant of two and greater than a predetermined constant of one times said predetermined capacitance in farads times said predetermined rated voltage in volts whereby relative motion between said films and said case in the axial direction and directions radial thereto are prevented while internal pressure rise of gas in said capacitor during operation is controlled.

19. The capacitor as claimed in claim 18 wherein said predetermined gas volume provided in said films is substantially equal to a predetermined instant of 1.2 times said predetermined capacitance in farads times said predetermined rated voltage in volts.

* * * * *

UNITED STATES PATENT AND TRADEMARK OFFICE
CERTIFICATE OF CORRECTION

PATENT NO. : 4,352,147

DATED : September 28, 1982

INVENTOR(S) : William H. Elias et al

It is certified that error appears in the above-identified patent and that said Letters Patent are hereby corrected as shown below:

In the Specification:

Column 1, line 11, "moe" should read -- more --.

Column 1, line 34, "whih" should read -- which --.

Column 1, line 62, "s" should read -- so --.

Column 2, line 10, "arboruponwhich" should read -- arbor upon which --.

Column 2, line 15, "cpa" should read -- cap --.

Column 2, line 40, "drawingnear" should read -- drawing near --.

Column 3, line 6, "2" should read -- 20 --.

Column 3, line 9, after "capacitor" insert -- element 16 towards the capacitor cap 34. --.

UNITED STATES PATENT AND TRADEMARK OFFICE
CERTIFICATE OF CORRECTION

PATENT NO. : 4,352,147

DATED : September 28, 1982

INVENTOR(S) : William H. Elias et al

It is certified that error appears in the above-identified patent and that said Letters Patent is hereby corrected as shown below:

Column 3, line 22, "ithas" should read --it has--.

Signed and Sealed this

Fourteenth Day of December 1982

[SEAL]

Attest:

GERALD J. MOSSINGHOFF

Attesting Officer

Commissioner of Patents and Trademarks